(12) United States Patent
Miller et al.

(10) Patent No.: US 8,014,371 B1
(45) Date of Patent: Sep. 6, 2011

(54) SYSTEM, MODEL AND METHOD FOR EVALUATING A NETWORK

(75) Inventors: Adrienne Pauline Miller, Kent, WA (US); Arun Ayyagari, Seattle, WA (US); Woo Sung Chung, Bellevue, WA (US)

(73) Assignee: The Boeing Company, Chicago, IL (US)

(*) Notice: Subject to any disclaimer, the term of this patent is extended or adjusted under 35 U.S.C. 154(b) by 145 days.

(21) Appl. No.: 12/466,175

(22) Filed: May 14, 2009

(51) Int. Cl.
*H04W 4/00* (2009.01)
(52) U.S. Cl. .......................... 370/338; 370/400; 370/255
(58) Field of Classification Search .................. 370/400, 370/338, 255; 455/436
See application file for complete search history.

(56) References Cited

U.S. PATENT DOCUMENTS

| | | | |
|---|---|---|---|
| 6,721,907 B2* | 4/2004 | Earl | 714/57 |
| 7,079,552 B2* | 7/2006 | Cain et al. | 370/469 |
| 7,349,906 B2* | 3/2008 | Cherkasova | 1/1 |

OTHER PUBLICATIONS

Liljenstam, Michael & Nicol, David M.; "On-Demand Computation of Policy Based Routes for Large-Scale Network Simulation"; Proceedings of the 2004 Winter Simulation Conference; Dec. 5-8, 2004.
Nicol, David M.; Liljenstam, Michael & Liu, Jason; "Advanced Concepts in Large-Scale Network Simulation"; Proceedings of the 2005 Winter Simulation Conference; Dec. 4-7, 2005.
Mahamod, Ismail; Mohamad, Shanudin & Raed, Saqour; "Discrete-Event Simulation Modeling Tool for Routing Process in GPSR Ad Hoc Network Routing Protocol"; Proceedings of the 2007 IEEE International Conference on Telecommunications and Malaysian International Conference on Communications; May 14-17, 2007; Penang, Malaysia.
Peng, Andy S.; Eickhoff, Brian R.; He,Tian & Lilja, David J.; "Toward Consolidated Tactical Network Architecture: A Modeling and Simulation Study"; IEEE Conference Proceedings; Nov. 17-19, 2008.

* cited by examiner

*Primary Examiner* — Ricky Ngo
*Assistant Examiner* — Chandrahas Patel
(74) *Attorney, Agent, or Firm* — Law Office of Donald D. Mondul

(57) ABSTRACT

A system for evaluating a network having a plurality of domains, each domain embodying a respective topology, includes: (a) at least one gateway unit effecting signal handling between adjacent domains; (b) a plurality of communicating nodes coupled with the at least one gateway unit; and (c) at least one respective edge establishing a respective communication link between adjacent respective communicating nodes. At least one first selected communicating node is a unicast node. At least one second selected communicating node is a multicast node. At least one communicating node is a media node. Each unicast node is configured for handling messages addressed to the unicast node. Each multicast node is connected with at least one media node within a domain. Each media node is configured for handling messages addressed to multicast nodes connected with the media node individually or en masse.

20 Claims, 11 Drawing Sheets

| | Dest1 | Dest2 | Dest3 | Dest4 | Dest5 | Dest6 | Dest7 | Dest8 | Dest9 | Dest10 | Dest11 | Dest12 | Dest13 | Dest14 | Dest15 | Dest16 | Dest17 | Dest18 | Dest19 |
|---|---|---|---|---|---|---|---|---|---|---|---|---|---|---|---|---|---|---|---|
| 1 | 9 | 9 | 9 | 9 | 9 | 9 | 9 | 9 | 9 | 9 | 9 | 9 | 9 | 9 | 9 | 9 | 9 | 9 | 9 |
| 2 | 13 | 13 | 13 | 13 | 13 | 13 | 13 | 13 | 13 | 13 | 13 | 13 | 13 | 13 | 13 | 13 | 13 | 13 | 13 |
| 3 | 11 | 11 | 11 | 11 | 11 | 11 | 10 | 26 | 11 | 11 | 11 | 11 | 11 | 11 | 11 | 11 | 11 | 11 | 11 |
| 4 | 1 | 1 | 1 | 1 | 0 | 23 | 0 | 0 | 23 | 23 | 23 | 23 | 23 | 23 | 23 | 23 | 23 | 23 | 23 |
| 5 | 2 | 3 | 4 | 15 | 0 | 24 | 0 | 0 | 25 | 5 | 24 | 24 | 24 | 24 | 24 | 24 | 24 | 24 | 24 |
| 6 | 0 | 0 | 0 | 0 | 0 | 19 | 0 | 0 | 0 | 0 | 0 | 16 | 19 | 19 | 19 | 19 | 19 | 19 | 19 |
| 7 | 0 | 0 | 0 | 0 | 0 | 17 | 0 | 0 | 0 | 0 | 0 | 0 | 0 | 17 | 17 | 17 | 17 | 17 | 17 |
| 8 | 0 | 0 | 0 | 0 | 0 | 22 | 0 | 0 | 0 | 0 | 0 | 0 | 0 | 0 | 22 | 22 | 22 | 22 | 22 |
| 9 | 0 | 0 | 0 | 0 | 0 | 7 | 0 | 0 | 0 | 0 | 0 | 0 | 0 | 0 | 7 | 7 | 20 | 21 | 7 |
| 10 | 0 | 0 | 0 | 0 | 0 | 18 | 0 | 0 | 0 | 0 | 0 | 0 | 0 | 0 | 0 | 18 | 0 | 0 | 18 |
| 11 | 0 | 0 | 0 | 0 | 0 | 12 | 0 | 0 | 0 | 0 | 0 | 0 | 0 | 0 | 0 | 8 | 0 | 0 | 14 |

FIG. 3

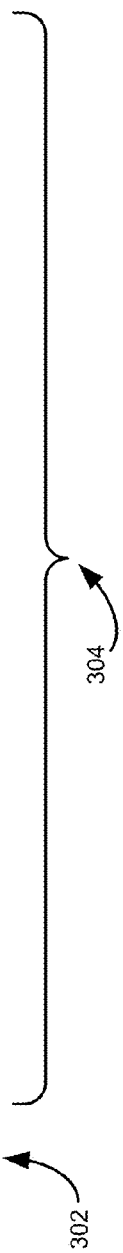

SYSTEM, MODEL AND METHOD FOR EVALUATING A NETWORK

TECHNICAL FIELD

The present disclosure may be directed to communication networks, and especially to systems, models and methods for evaluating performance of communication networks.

BACKGROUND

Multi-domain network topologies may be characteristic of systems-of-systems architectures where not all nodes in the system share the same communication capability and therefore cannot exchange information directly. In such a multi-domain network, nodes also may not have knowledge of the topology of other domains and therefore cannot plan how to route a message to a remote node. Gateway nodes, therefore, may be required to reach remote network domains.

High fidelity network simulation packages may have been available to study network utilization issues. Such high fidelity simulation packages may generally focus on protocol level detail, physical layer characteristics or network emulation. Less sophisticated network modeling approaches may be available that also model a network at a high level, but which may require extensive manual specification of message routing and behavior. The existing higher fidelity solutions may experience relatively longer runtimes as scenario size increases. Increased simulation runtimes and scenario set-up times may be a burden during early concept development stages of network solution development when there are many uncertainties, and few details that support high fidelity modeling. The higher fidelity approaches may require protocol level detail. The simpler modeling approaches may be relatively inflexible, relatively non-scalable, and may require time-consuming manual user set-up for route and gateway selection.

There is a need for a system, model and method for evaluating a communication network that may provide flexibility, straightforward characterization of the network, and automated message route selection in the simulation.

SUMMARY

A system for evaluating a network having a plurality of domains, each domain embodying a respective topology, includes: (a) at least one gateway unit effecting signal handling between adjacent domains; (b) a plurality of communicating nodes coupled with the at least one gateway unit; and (c) at least one respective edge establishing a respective communication link between adjacent respective communicating nodes. At least one first selected communicating node is a unicast node. At least one second selected communicating node is a multicast node. At least one communicating node is a media node. Each unicast node is configured for handling messages addressed to the unicast node. Each multicast node is connected with at least one media node within a domain. Each media node is configured for handling messages addressed to multicast nodes connected with the media node individually or en masse.

A model for evaluating a network; the network including a plurality of domains embodying a plurality of network types; the model comprising: (a) a plurality of nodes distributed among the plurality of domains; each respective node of at least one first selected node of the plurality of nodes representing a physical communication node in the network and having at least one respective radio object for modeling communications in a respective domain of the plurality of domains; each respective node of at least one second selected node of the plurality of nodes representing a physical gateway node in the network and having a respective plurality of radio objects for modeling communications in two or more domains of the plurality of domains; each respective node of at least one third selected node of the plurality of nodes representing a media node in the network and having at least one respective radio object for modeling communications among at least one the respective second selected node and a plurality of the respective first selected nodes; (b) a plurality of edges connecting the plurality of nodes; each respective edge of the plurality of edges connecting a respective two connected nodes of the plurality of nodes; each the respective edge being associated with a respective network type of the plurality of network types; and (c) a route managing unit coupled with at least the at least a subset of the plurality of nodes; the route managing unit cooperating with the at least one second selected node and the plurality of edges to effect developing at least one route table; the at least one route table being employed by the route managing unit to identify selected respective edges of the plurality of edges for effecting routing of a message through the network.

A method for evaluating a network; the network including a plurality of domains; each respective domain of the plurality of domains embodying a respective topology; the method comprising: (a) in no particular order: (1) providing at least one gateway unit; (2) providing a plurality of communicating nodes coupled with the at least one gateway unit; at least one first selected node of the plurality of communicating nodes being a unicast node; at least one second selected node of the plurality of communicating nodes being a multicast node; at least one node of the plurality of communicating nodes being a media node; each respective unicast node of the at least one unicast node being configured for handling message traffic addressed to the respective unicast node; each respective multicast node of the at least one multicast node being connected with at least one media node of the at least one media node within a respective domain of the plurality of domains; the respective media node being configured for handling message traffic addressed to respective the multicast nodes connected with the respective media node individually or en masse; and (3) providing at least one respective edge establishing a respective communication link between adjacent respective communicating nodes of the plurality of communicating nodes; and (b) operating each respective gateway unit of the at least one gateway unit in cooperation with the plurality of communicating nodes to effect signal handling between adjacent the respective domains.

It is, therefore, a feature of the present disclosure to provide a system, model and method for evaluating a communication network that may provide flexibility, straightforward characterization of the network, and automated message route selection in the simulation.

Further features of the present disclosure will be apparent from the following specification and claims when considered in connection with the accompanying drawings, in which like elements are labeled using like reference numerals in the various figures, illustrating the preferred embodiments of the disclosure.

BRIEF DESCRIPTION OF THE DRAWINGS

FIG. 3 is an example of a representative route table.

FIG. 10 is a representative gateway path lengths table that may be employed in connection with the present disclosure.

FIG. 11 is a representative gateway connectivity table that may be employed in connection with the present disclosure.

DETAILED DESCRIPTION

The terms "coupled" and "connected", along with their derivatives, may be used herein. It should be understood that these terms are not intended as synonyms for each other. Rather, in particular embodiments, "connected" may be used to indicate that two or more elements are in direct physical or electrical contact with each other. "Coupled" may be used to indicated that two or more elements are in either direct or indirect (with other intervening elements between them) physical or electrical contact with each other, or that the two or more elements co-operate or interact with each other (e.g. as in a cause and effect relationship).

The present disclosure may support the creation of a moderate fidelity simulation tool for the purpose of conducting high level system trade studies. The present disclosure may support a class of analysis problems that focuses on network architecture and conceptual trade studies that do not require physical layer or protocol level modeling. Such high level trade studies may support initial system engineering efforts, as opposed to system design activities. The modeling approach of the present disclosure may support the creation of flexible, scalable, and easily configured custom simulation models for this problem domain.

The present disclosure may include a flexible and scalable architecture for characterizing a simulation scenario and bandwidth management, a method for implementing multicast or unicast bandwidth management in a simulation, a method for developing a route solution in a simulation, and a method for gateway selection in a simulation. In order to achieve efficient simulation of a high level multi-domain network topology that may be easy to specify and may be scalable, the present disclosure may adopt an object oriented approach. For purposes of this disclosure, the term "unicast" is intended to refer to a communication from one device to another device. Unicast may sometimes be referred to as effecting point-to-point communications. For purposes of this disclosure, the term "multicast" is intended to refer to communication from a single originating device to multiple destination devices. The term "en masse" refers to a media node communicating a multicast message to a plurality of multicast nodes to which a multicast message is addressed.

Figure 1:
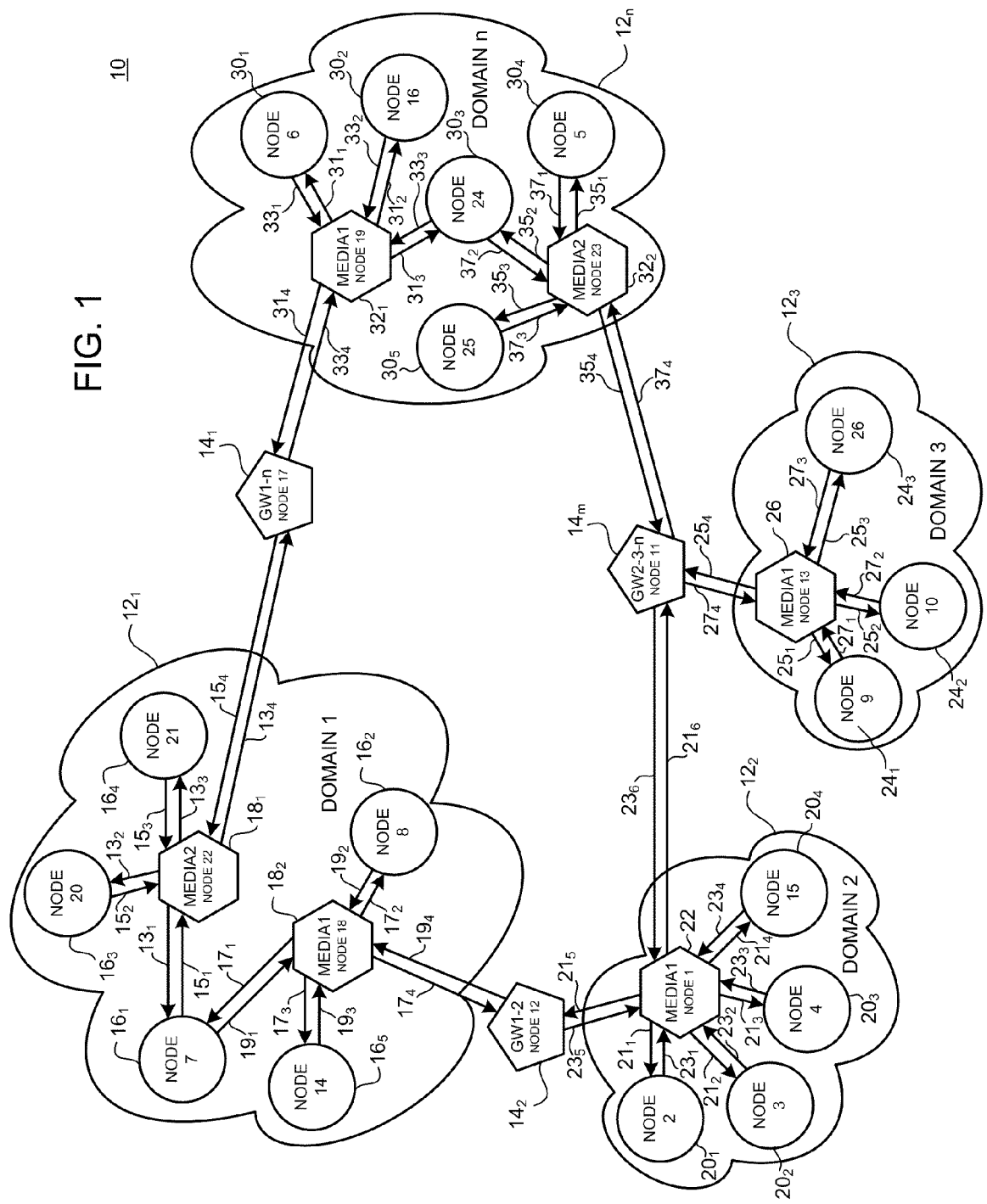
FIG. 1 is a schematic diagram of a representative multi-domain network in which the present disclosure may be advantageously employed.

FIG. 1 is a schematic diagram of a representative multi-domain network in which the present disclosure may be advantageously employed. In FIG. 1, a network 10 may include domains $12_1$, $12_2$, $12_3$, $12_n$. The indicator "n" is employed to signify that there can be any number of domains in network 10. The inclusion of four domains $12_1$, $12_2$, $12_3$, $12_n$ in FIG. 1 is illustrative only and does not constitute any limitation regarding the number of domains that may be included in a network that may employ the present disclosure. Throughout this description, use of a reference numeral using a generic subscript herein may be taken to mean that any respective member of the plurality of elements having the same reference numeral may be regarded as included in the description. Thus, by way of example and not by way of limitation, referring to domain $12_n$ in describing FIG. 1 may be taken to mean that any domain—$12_1$, $12_2$, $12_3$, or $12_n$ (FIG. 1)—may be regarded as capable of employment as described.

Gateway nodes or units $14_1$, $14_2$, $14_m$ may be coupled between or among adjacent domains $12_n$ to handle communication between or among adjacent domains $12_n$. Gateway nodes $14_1$, $14_2$, $14_m$ are illustrated in FIG. 1 as being located between or among adjacent domains $12_n$ as a matter of drawing convenience to reduce clutter in FIG. 1. One skilled in the art of modeling communication networks may recognize that a gateway node or unit is actually a part of each domain the gateway node or unit serves and may be illustrated as located within each of the adjacent domains served.

Gateway node or unit $14_1$ may be identified as node 17. Gateway node or unit $14_2$ may be identified as node 12. Gateway node or unit $14_m$ may be identified as node 11. Gateway unit $14_1$ may be coupled between domains $12_1$, $12_n$ to handle communications between domains $12_1$, $12_n$. Gateway $14_1$ may be labeled "GW1-n" in FIG. 1 to reinforce indication of the role of gateway $14_1$ in linking domains $12_1$ and $12_n$. Gateway unit $14_2$ may be coupled between domains $12_1$, $12_2$ to handle communications between domains $12_1$, $12_2$. Gateway $14_2$ may be labeled "GW1-2" in FIG. 1 to reinforce indication of the role of gateway $14_2$ in linking domains $12_1$ and $12_2$. Gateway unit $14_m$ may be coupled among domains $12_2$, $12_3$, $12_n$ to handle communications among domains $12_2$, $12_3$, $12_n$. Gateway $14_m$ may be labeled "GW2-3-n" in FIG. 1 to reinforce indication of the role of gateway $14_m$ in linking domains $12_2$, $12_3$ and $12_n$. The indicator "m" is employed to signify that there can be any number of gateway units in network 10. The inclusion of three gateway units $14_1$, $14_2$, $14_m$ in FIG. 1 is illustrative only and does not constitute any limitation regarding the number of gateway units that may be included in a network that may employ the present disclosure. Referring to gateway unit $14_m$ in describing FIG. 1 may be taken to mean that any gateway unit—$14_1$, $14_2$, or $14_m$ (FIG. 1)—may be regarded as capable of employment as described.

Each domain $12_n$ may include a plurality of nodes. Nodes may be sources or destinations for message traffic. There may be two types of nodes. "Real" nodes may correspond to physical entities in a scenario. Gateway units $14_m$ may be real nodes. "Media" nodes may not be physical nodes. Media nodes may exist as a simulation convenience and may have special capabilities to handle broadcast traffic if desired. All nodes that connect to a "media" node may be regarded as being one hop away from each other. A "unicast node" may be a real node with capability to send and receive unicast messages. A "multicast node" may be a real node with capability to send and receive multicast messages. A given real node object may possess both capabilities. Media nodes may be connected to unicast senders and receivers as well as multicast senders and receivers. This node-convention may simplify a scenario and may reduce the number of links that need to be simulated. There may be no limit to how many media nodes may exist in a domain $14_m$. Multiple media nodes may be used to depict clusters of network participants that are all within one hop of each other. Alternatively, a domain $14_m$ may avoid employing a "media" node. In such a situation, direct node-to-node connections may be simulated to depict all "neighbors" (i.e., to depict all adjacent nodes). Nodes may be connected using network edges. Each network edge may be a directional point-to-point connection between two adjacent nodes. The set of network edges in a scenario may define node connectivity in the modeled network and may be used to calculate message routing.

Thus, domain $12_1$ may include real nodes $16_1$, $16_2$, $16_3$, $16_4$, $16_5$. The inclusion of five real nodes $16_1$, $16_2$, $16_3$, $16_4$, $16_5$ in domain $12_1$ is illustrative only and does not constitute any limitation regarding the number of real nodes that may be included in domain $12_1$. Domain $12_1$ may also include media nodes $18_1$, $18_2$. Media node $18_1$ may be connected with real nodes $16_1$, $16_3$, $16_4$. Media node $18_2$ may be connected with real nodes $16_1$, $16_2$, $16_5$. Gateway unit $14_1$ may be connected with media node $18_1$. Gateway unit $14_2$ may be connected with media node $18_2$.

Node $16_1$ may be identified as node 7. Node $16_2$ may be identified as node 8. Node $16_3$ may be identified as node 20. Node $16_4$ may be identified as node 21. Node $16_5$ may be identified as node 14. Media node $18_1$ may be identified as node 22. Media node $18_2$ may be identified as node 18.

Outbound edge $13_1$ may unidirectionally connect media node $18_1$ with node $16_1$. Outbound edge $13_2$ may unidirectionally connect media node $18_1$ with node $16_3$. Outbound edge $13_3$ may unidirectionally connect media node $18_1$ with node $16_4$. Outbound edge $13_4$ may unidirectionally connect media node $18_1$ with gateway unit $14_1$. Inbound edge $15_1$ may unidirectionally connect node $16_1$ with media node $18_1$. Inbound edge $15_2$ may unidirectionally connect node $16_3$ with media node $18_1$. Inbound edge $15_3$ may unidirectionally connect node $16_4$ with media node $18_1$. Inbound edge $15_4$ may unidirectionally connect gateway unit $14_2$ with media node $18_1$.

Outbound edge $17_1$ may unidirectionally connect media node $18_2$ with node $16_1$. Outbound edge $17_2$ may unidirectionally connect media node $18_2$ with node $16_2$. Outbound edge $17_3$ may unidirectionally connect media node $18_2$ with node $16_5$. Outbound edge $17_4$ may unidirectionally connect media node $18_2$ with gateway unit $14_2$. Inbound edge $19_1$ may unidirectionally connect node $16_1$ with media node $18_2$. Inbound edge $19_2$ may unidirectionally connect node $16_2$ with media node $18_2$. Inbound edge $19_3$ may unidirectionally connect node $16_5$ with media node $18_2$. Inbound edge $19_4$ may unidirectionally connect gateway unit $14_2$ with media node $18_2$.

Domain $12_2$ may include real nodes $20_1$, $20_2$, $20_3$, $20_4$. The inclusion of four real nodes $20_1$, $20_2$, $20_3$, $20_4$ in domain $12_2$ is illustrative only and does not constitute any limitation regarding the number of real nodes that may be included in domain $12_2$. Domain $12_2$ may also include a media node 22. Media node 22 may be connected with real nodes $20_1$, $20_2$, $20_3$, $20_4$. Gateway unit $14_2$ may be connected with media node 22.

Node $20_1$ may be identified as node 2. Node $20_2$ may be identified as node 3. Node $20_3$ may be identified as node 4. Node $20_4$ may be identified as node 15. Media node 22 may be identified as node 1.

Outbound edge $21_1$ may unidirectionally connect media node 22 with node $20_1$. Outbound edge $21_2$ may unidirectionally connect media node 22 with node $20_2$. Outbound edge $21_3$ may unidirectionally connect media node 22 with node $20_3$. Outbound edge $21_4$ may unidirectionally connect media node 22 with node $20_4$. Outbound edge $21_5$ may unidirectionally connect media node 22 with gateway unit $14_2$. Outbound edge $21_6$ may unidirectionally connect media node 22 with gateway unit $14_m$. Inbound edge $23_1$ may unidirectionally connect node $20_1$ with media node 22. Inbound edge $23_2$ may unidirectionally connect node $20_2$ with media node 22. Inbound edge $23_3$ may unidirectionally connect node $20_3$ with media node 22. Inbound edge $23_4$ may unidirectionally connect node $20_3$ with media node 22. Inbound edge $23_5$ may unidirectionally connect gateway unit $14_2$ with media node 22. Inbound edge $23_6$ may unidirectionally connect gateway unit $14_m$ with media node 22.

Domain $12_3$ may include real nodes $24_1$, $24_2$, $24_3$. The inclusion of three real nodes $24_1$, $24_2$, $24_3$ in domain $12_3$ is illustrative only and does not constitute any limitation regarding the number of real nodes that may be included in domain $12_3$. Domain $12_3$ may also include a media node 26. Media node 26 may be connected with real nodes $24_1$, $24_2$, $24_3$. Gateway unit $14_m$ may be connected with media node 26.

Node $24_1$ may be identified as node 9. Node $24_2$ may be identified as node 10. Node $24_3$ may be identified as node 26. Media node 26 may be identified as node 13.

Outbound edge $25_1$ may unidirectionally connect media node 26 with node $24_1$. Outbound edge $25_2$ may unidirectionally connect media node 26 with node $24_2$. Outbound edge $25_3$ may unidirectionally connect media node 26 with node $24_3$. Outbound edge $25_4$ may unidirectionally connect media node 26 with gateway unit $14_m$. Inbound edge $27_1$ may unidirectionally connect node $24_1$ with media node 26. Inbound edge $27_2$ may unidirectionally connect node $24_2$ with media node 26. Inbound edge $27_3$ may unidirectionally connect node $24_3$ with media node 26. Inbound edge $27_4$ may unidirectionally connect gateway unit $14_m$ with media node 26.

Domain $12_n$ may include real nodes $30_1$, $30_2$, $30_3$, $30_4$, $30_5$. The inclusion of five real nodes $30_1$, $30_2$, $30_3$, $30_4$, $30_5$ in domain $12_n$ is illustrative only and does not constitute any limitation regarding the number of real nodes that may be included in domain $12_n$. Domain $12_n$ may also include media nodes $32_1$, $32_2$. Media node $32_1$ may be connected with real nodes $16_1$, $16_3$, $16_4$. Media node $18_2$ may be connected with real nodes $30_1$, $30_2$, $30_3$. Gateway unit $14_1$ may be connected with media node $32_1$. Gateway unit $14_m$ may be connected with media node $32_2$.

Node $30_1$ may be identified as node 6. Node $30_2$ may be identified as node 16. Node $30_3$ may be identified as node 24. Node $30_4$ may be identified as node 5. Node $30_5$ may be identified as node 25. Media node $32_1$ may be identified as node 19. Media node $32_2$ may be identified as node 23.

Outbound edge $31_1$ may unidirectionally connect media node $32_1$ with node $30_1$. Outbound edge $31_2$ may unidirectionally connect media node $32_1$ with node $30_2$. Outbound edge $31_3$ may unidirectionally connect media node $32_1$ with node $30_3$. Outbound edge $31_4$ may unidirectionally connect media node $32_1$ with gateway unit $14_1$. Inbound edge $33_1$ may unidirectionally connect node $30_1$ with media node $32_1$. Inbound edge $33_2$ may unidirectionally connect node $30_2$ with media node $32_1$. Inbound edge $33_3$ may unidirectionally connect node $30_3$ with media node $32_1$. Inbound edge $33_4$ may unidirectionally connect gateway unit $14_1$ with media node $32_1$.

Outbound edge $35_1$ may unidirectionally connect media node $32_2$ with node $30_4$. Outbound edge $35_2$ may unidirectionally connect media node $32_2$ with node $30_3$. Outbound edge $35_3$ may unidirectionally connect media node $32_2$ with node $30_5$. Outbound edge $35_4$ may unidirectionally connect media node $32_2$ with gateway unit $14_m$. Inbound edge $37_1$ may unidirectionally connect node $30_4$ with media node $32_2$. Inbound edge $37_2$ may unidirectionally connect node $30_3$ with media node $32_2$. Inbound edge $37_3$ may unidirectionally connect node $30_5$ with media node $32_2$. Inbound edge $37_4$ may unidirectionally connect gateway unit $14_m$ with media node $32_2$.

Figure 2:
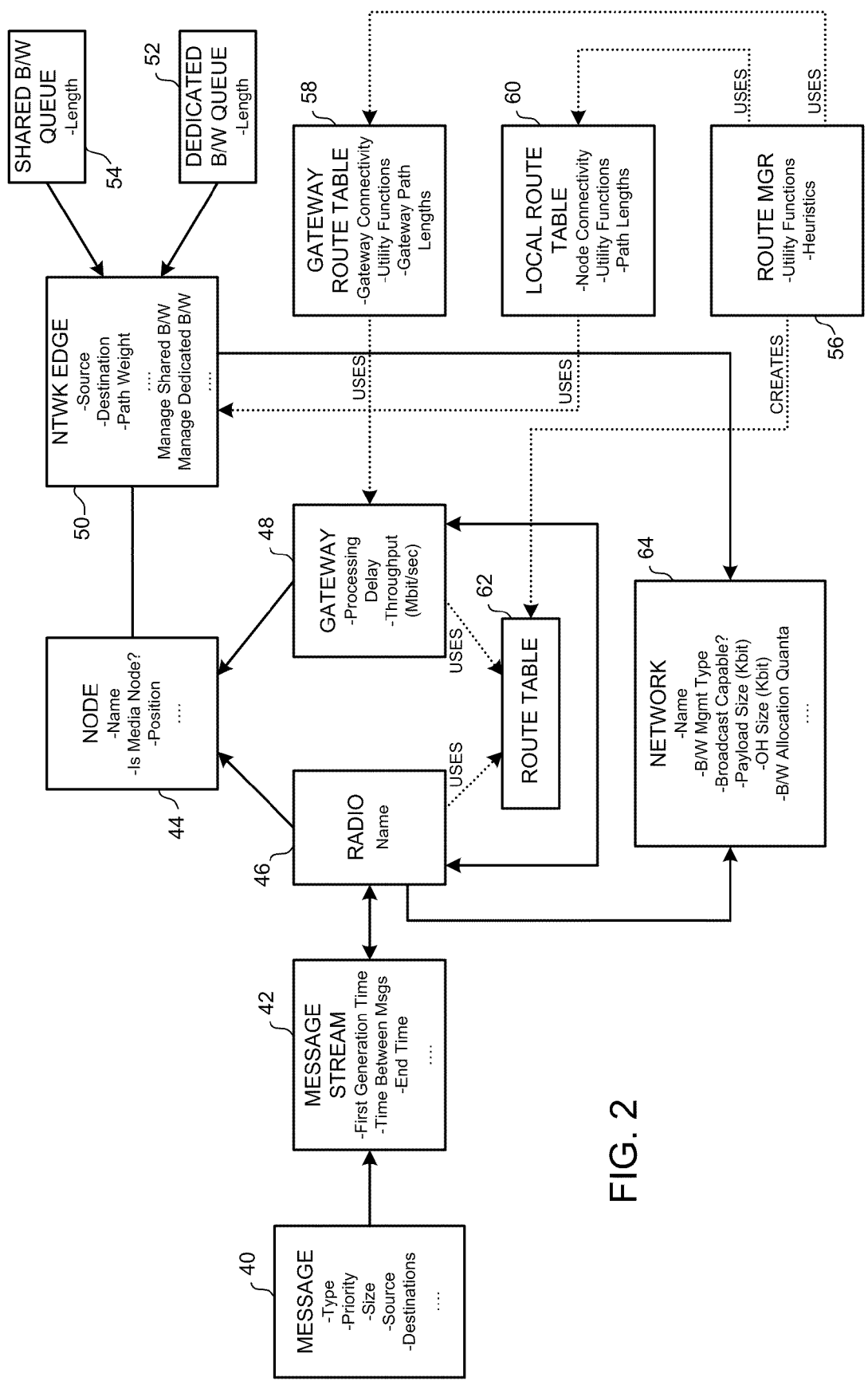
FIG. 2 is a schematic diagram illustrating selected model objects and relationships among those model objects.

FIG. 2 is a schematic diagram illustrating selected model objects and relationships among those model objects. In FIG. 2, a message (indicated by a block 40) may have particular characteristics such as, by way of example and not by way of limitation, message type, priority, size, source destination or destinations and other characteristics. Message 40 may be placed in a message stream (indicated by a block 42). One message stream is an aggregation of one or more messages. Characteristics of message stream 42 may include, by way of example and not by way of limitation, time to effect generation of message 40 for the first time, time between successive messages in message stream 42, end time for message 40 traversing message stream 42, and other characteristics.

Each node (indicated by a block 44) may own one or more radio objects (indicated by a block 46). One node may be associated with one or more network edges, such as, by way of example and not by way of limitation, an incoming edge and an outgoing edge. Each instance of a network edge may be associated with exactly two nodes. Each radio object 46 may be associated with exactly one domain (e.g., a domain $12_n$; FIG. 1) and may be responsible for transmitting and receiving message traffic, indicated by traversing message stream 42. Radio objects may be responsible for transmitting and receiving all traffic to and from their respective node in a specific network domain. Message streams may stay within a single domain or may traverse multiple domains. There may be multiple message streams. Message streams may stay within a single domain or may traverse multiple domains.

A node may own (i.e., be composed of) one or more radios. Each radio object may be associated with one network topology or domain. Gateway nodes may be associated with greater than one topology.

Nodes 44 may also own gateway functionality (indicated by a block 48). Nodes 44 may be connected or coupled with one or more network edges (indicated by a block 50). Network edges 50 may establish certain characteristic for connections between domains such as, by way of example and not by way of limitation, edge source, edge destination, and path weight. Edge objects may provide connectivity from one node to another node. Messages may use multiple edges as they traverse a network. Each network edge 50 may connect exactly two nodes 44. Network edges 50 may be associated with one network type. Depending on model settings for network type, each network edge 50 may manage its own dedicated bandwidth allocation (represented by a block 52) or may use a shared network bandwidth allocation (indicated by a block 54) shared with more than one edge. Radio objects 46 may be employed in cooperation with network edges 50 to establish network characteristics 64 such as, by way of example and not by way of limitation, network name, bandwidth management type, broadcast capability, payload size, overhead size, bandwidth allocation quanta, and other characteristics. That is, radio objects and edge objects may be associated with a network definition containing characteristics such as payload size and other information.

A route manager (indicated by a block 56) may use information that describes gateway connectivity such as, by way of example and not by way of limitation, by employing a gateway route table 58 and a local route table 60 to derive a route table 62. A route table will be described in greater detail in connection with FIG. 3 below. A route table may be used in a simulation that radio objects 46 and gateway functions 48 may use to decide how to forward a message 40 in message stream 42 to a designated destination.

Separating model logic into objects is advantageous in situations where a network scenario may be changed. To effect such a desired change a new set of objects may be easily invoked to describe a new scenario. The model logic separated into objects (as described in connection with FIG. 2) may avoid a need to manually configure a new simulation for each new scenario, and may provide an ability to represent a variety of network topologies in a straightforward manner. A prototype simulation built using this logic-object structure may be capable of automatically identifying and employing correct model objects to represent a given scenario definition.

FIG. 3 is an example of a representative route table. In FIG. 3, a route table 70 illustrates all possible routes in network 10 (FIG. 1) that may be available to a message from node 9 (i.e., node $24_1$; FIG. 1). Routes may be indicated in respective columns 72 designated by various destinations (e.g., "Dest1"). Hops included in a respective route may be indicated in rows 74. Columns 72 may cooperate with rows 74 to establish an array of matrix positions, each respective matrix position being identified by unique (Dest#, Row#) coordinates. A respective node at which a particular hop may terminate may be indicated at a respective matrix position (Dest#, Row #). Media nodes are not valid destinations, which is why media nodes do not appear in FIG. 3 as final destinations (last entry in a column). One may note, however, that media nodes may appear in FIG. 3 along a route.

Referring to FIG. 1 and FIG. 3 together, one may observe that a message may be routed from node 9 to node 2 via hops to nodes 13, 11, 1 (Column Dest1; FIG. 3). A message may be routed from node 9 to node 3 via hops to nodes 13, 11, 1 (Column Dest2; FIG. 3). In order to avoid unnecessary prolixity, hops and destinations for all routes available from node 9 will not be recited here. It may be regarded as within the skill of one skilled in the art of network design to understand how one may use FIGS. 1 and 3 to ascertain a route from node 9 to another particular node.

Similar route tables may be generated for each other node in network 10 (FIG. 1) to present all possible routes available from each node to respective other nodes within network 10.

A route table may facilitate automated routing of message traffic through a topology or topologies associated with domains in a network based on user preferences expressed as utility functions. A message stream definition (e.g., message stream 42; FIG. 2) may include information about the source of a message and which set of destination nodes are supposed to receive the message. The specific route each respective message takes through the defined topologies of the network may be defined automatically according to the topology description and a set of user specified utility functions. There must therefore be a defined sequence of "hops" through the network for each message destination in the simulation scenario. Route table 70, and similar route tables for other originating nodes, may provide such a defined sequence of hops.

Figure 4:
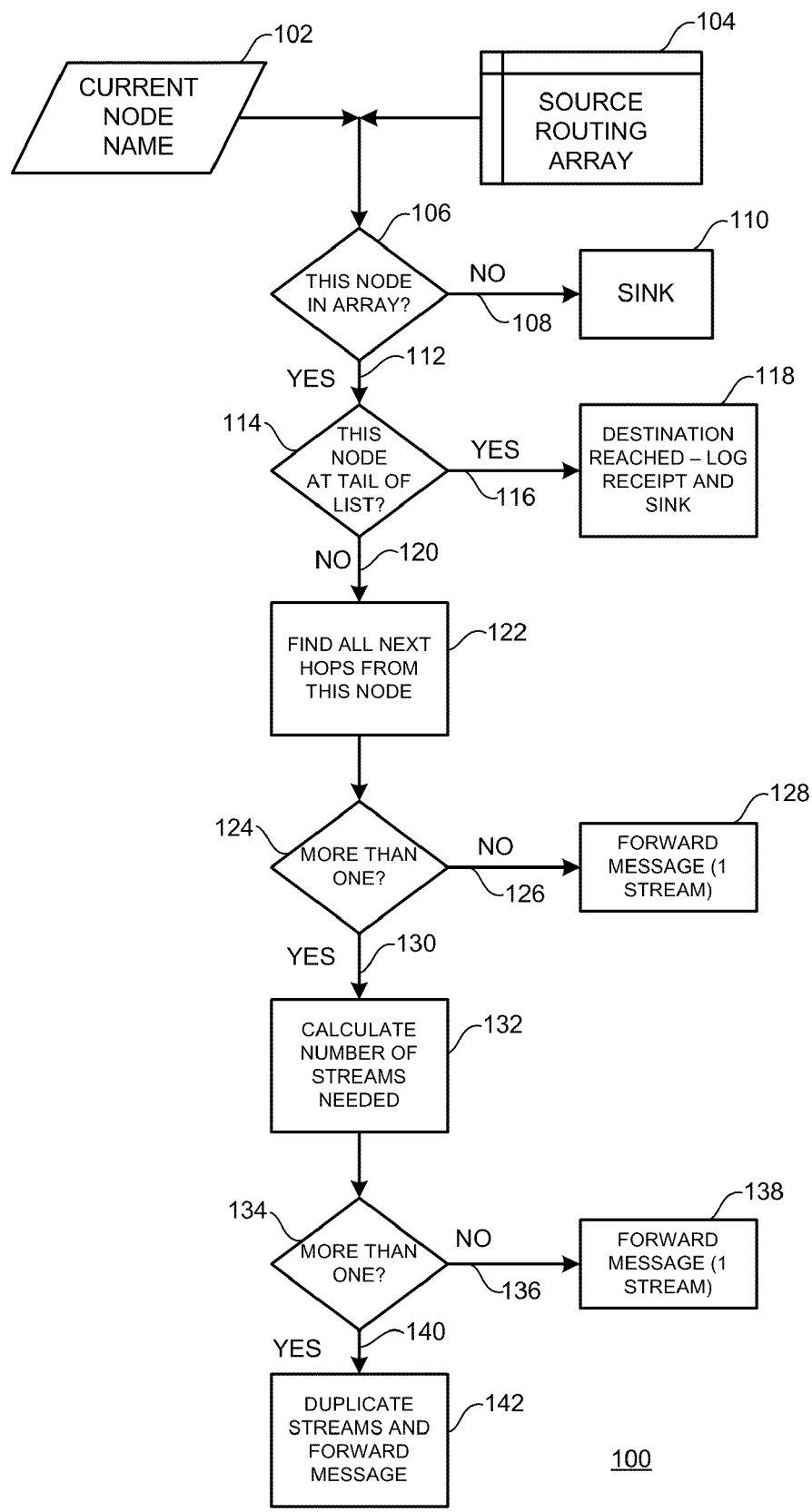
FIG. 4 is a flow chart illustrating a process involving branching message streams and decrementing bandwidth associated with employing the present disclosure.

FIG. 4 is a flow chart illustrating a process involving branching message streams and decrementing bandwidth associated with employing the present disclosure. In FIG. 4, a method 100 may begin with a particular node in an array, as indicated by a block 102. A source routing array, represented by a block 104, may be embodied in route table 70 (FIG. 3) or a plurality of route tables.

Method 100 may continue with posing a query whether the current node identified in block 102 is in the array or network being evaluated, as indicated by a query block 106. If the current node identified in block 102 is not in the array being evaluated, method 100 may continue from query block 106 via a NO response line 108 to terminate at a sink 110. If the current node identified in block 102 is in the array being evaluated, method 100 may continue from query block 106 via a YES response line 112.

Method 100 may continue by posing a query whether the current node identified in block 102 is at the tail or end of a list, as indicated by a query block 114. If the current node identified in block 102 is at the tail or end of a list, method 100 may continue from query block 114 via a YES response line 116 to conclude that the desired destination has been reached. Method 100 may then log receipt of the message and terminate at a sink, as indicated by a block 118. If the current node identified in block 102 is not at the tail or end of a list, method 100 may continue from query block 114 via a NO response line 120 to find all next hops from the current node, as indicated by a block 122.

Method 100 may continue by posing a query whether there is more than one next hop found pursuant to block 122, as indicated by a query block 124. If there is not more than one next hop found pursuant to block 122, method 100 may proceed from query block 124 via a NO response line 126 to effect forwarding the message in a single stream, as indicated by a block 128. If there is more than one next hop found pursuant to block 122, method 100 may proceed from query block 124 via a YES response line 1130. Method 100 may continue by calculating a number of streams necessary for handling the extant message, as indicated by a block 132.

Method 100 may continue by posing a query whether more than one stream is necessary for handling the extant message, as indicated by a query block 134. If more than one stream is not necessary for handling the extant message, method 100 may proceed from query block 134 via a NO response line 136 to effect forwarding the message in a single stream, as indicated by a block 138. If more than one stream is necessary for handling the extant message, method 100 may proceed from query block 134 via a YES response line 140 to establish duplicate streams and forward the extant message, as indicated by a block 142.

The system, model and method of the present disclosure may preferably be capable of properly decrementing bandwidth resources depending on whether a message is treated as a unicast message intended for a single recipient or a broadcast or multicast message intended for more than one recipient. In the case of unicast messages that are distributed across all or part of a network, available bandwidth must be decremented once for each unique "next hop" destination along the route. In contrast, multicast messages will consider the broadcast capabilities of the extant host networks so that multiple destinations on a single network may only need to decrement the bandwidth once. The decision to decrement bandwidth once per media group or once per next hop node uses a route table and user defined characteristics for the capabilities of each domain as described in FIG. 5.

Figure 5:
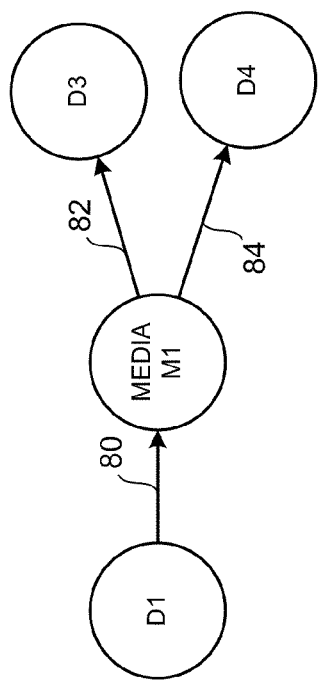
FIG. 5 is a schematic diagram illustrating accounting for bandwidth use at a media node when employing the present disclosure.

FIG. 5 is a schematic diagram illustrating accounting for bandwidth use at a media node when employing the present disclosure. In FIG. 5, a node D1 may send a message via a hop 80 to media node M1 for further transmission to nodes D3 (via a hop 82) and D4 (via a hop 84). If the message is supposed to be a unicast message, bandwidth may be decremented on each media-next hop edge. That is, bandwidth may be decremented in each of hops 82, 84. If the message is supposed to be multicast or broadcast message, the bandwidth may be decremented only once on the source-media edge 80 and all broadcast recipients may receive the message at the same time. Using this approach may simplify model logic for how to decrement bandwidth properly. Edge objects simply need to know whether either of their ends is a media node and whether the message they are passing is supposed to be a multicast message or a unicast message.

Edges may have an important property where an edge may either manage bandwidth individually (i.e., in a single queue employment) or a group of edges may be configured to share a bandwidth allocation (i.e., in a shared queue employment). Such edge settings may define the available bandwidth in a network. The unicast-multicast behavior by an edge then may decrement bandwidth as a model simulation runs in order to study network constraints, message latencies or other network characteristics.

Figure 6:
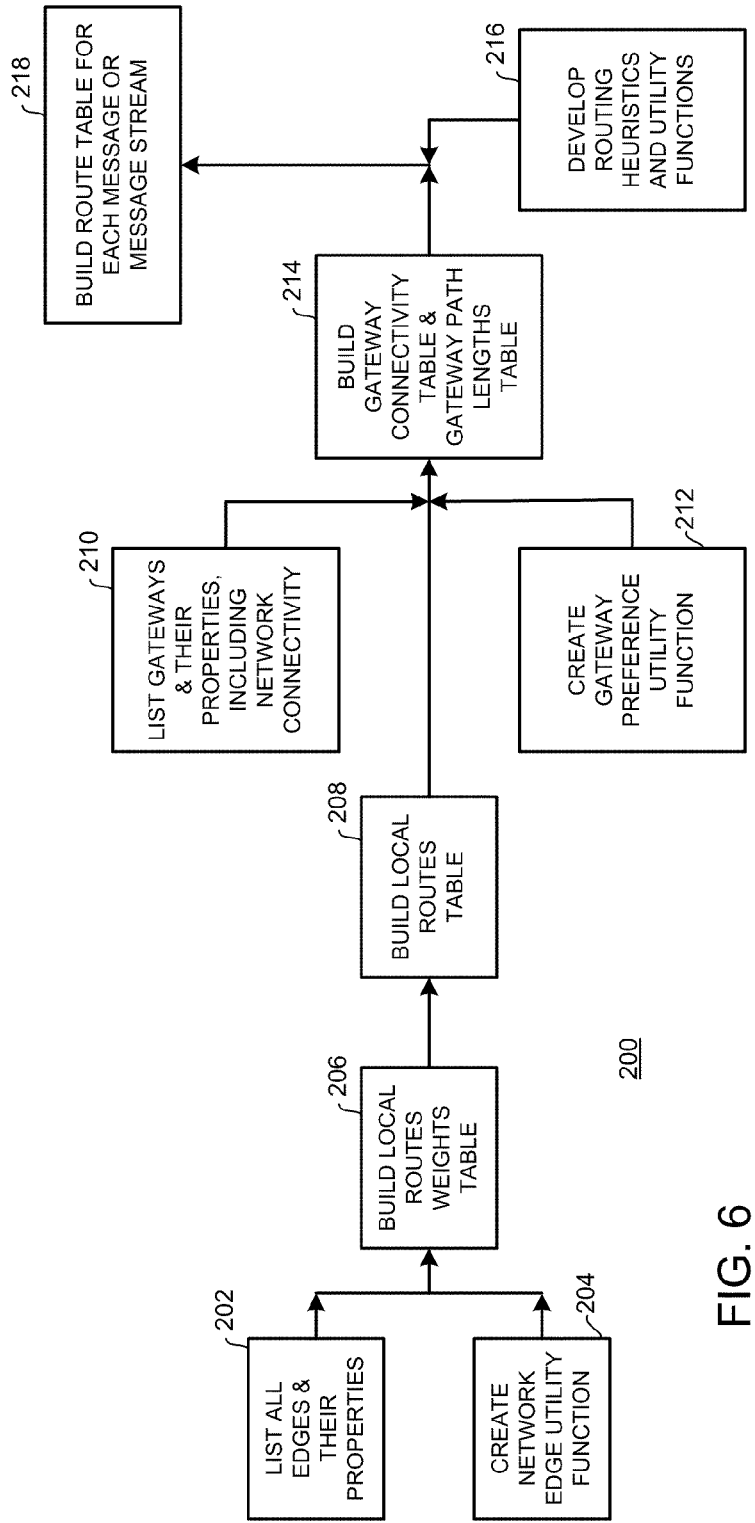
FIG. 6 is a flow chart illustrating a process for creating a route table employing the present disclosure.

FIG. 6 is a flow chart illustrating a process for creating a route table employing the present disclosure. In FIG. 6, a process 200 may begin with developing path weights for each of the node-to-node connections described by the set of network edges, as indicated by a block 202. A network edge utility function may be created, as indicated by a block 204. Path weights may be assigned according to the utility function to build a local routes weights table, as indicated by a block 206.

The local routes weights table may be employed to build a local routes table, as indicated by a block 208. A list of gateway units or nodes with their properties, including network connectivity (indicated by a block 210) and a gateway preference utility function (indicated by a block 212) may be employed with the local routes table to build a gateway connectivity table and gateway path lengths table, as indicated by a block 214.

Routing heuristics and utility functions may be built, as indicated by a block 216. The gateway connectivity table and gateway path lengths table (block 214) may be employed with the routing heuristics and utility functions (block 216) to build a route table for each message or message stream, as indicated by a block 218.

A heuristic may be an algorithm that is able to produce an acceptable solution to a problem in practical scenarios, but for which there is no formal proof of its correctness or the algorithm is not proven to produce a optimal solution or proven to use reasonable resources.

Figure 7:
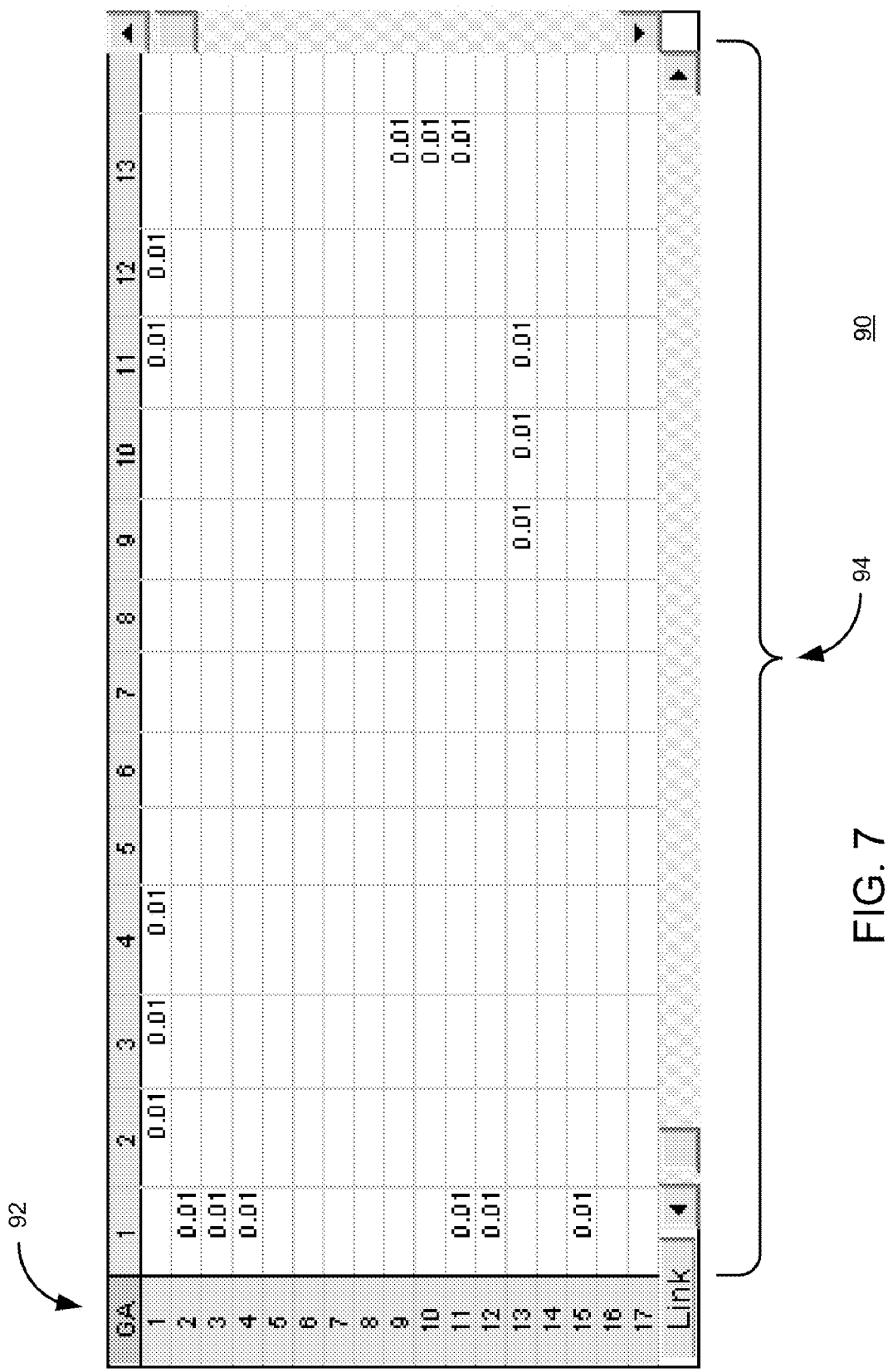
FIG. 7 is an exemplary local routes weights table.

FIG. 7 is an exemplary local routes weights table. In FIG. 7, a portion of a local routes or paths weights table 90 may present path weights for each of the node-to-node connections described by network edges. Path weights may be assigned according to a user defined utility function. A lowest cost path may have the minimum sum of weights for each hop between a source node and a destination node.

Source or originating nodes may be indicated in rows 92. Destination nodes may be indicated in columns 94. Columns 94 may cooperate with rows 94 to establish an array of matrix positions, each respective matrix position being identified by unique (Destination Node#, Source Node#) coordinates. A respective path weight associated with traversing a path between a particular source node and a particular destination node may be indicated at a respective matrix position (Destination Node#, Source Node#).

For the simple example presented in FIG. 7, a constant path weight of 0.01 has been allocated to each source node-destination node path. A blank matrix position may indicate no connection between those two nodes in a particular local domain. A route selected based on constant weights may have a minimum number of hops. Other utility functions may be written to reflect, by way of example and not by way of limitation, how busy a network edge is, how busy respective nodes are, physical distance between nodes, maximum capacity of a network associated with each edge or other parameters relating to "cost" of routing via a node or path. Varying factors represented by respective path weights may result in a different route being selected between a source node and a destination node.

Referring to FIG. 1 and FIG. 7 together, one may observe that paths may exist between node 1 and each of nodes 2, 3, 4, 11 and 12. Accordingly, there are path weights indicated in matrix positions (2,1), (3,1), (4,1), (11,1) and (12,1). Other matrix positions associated with originating or source node 1 are blank, indicating there is no connection between nodes indicated by those matrix positions.

It may be regarded as within the skill of one skilled in the art of network design to understand how one may use FIGS. 1 and 7 to ascertain a path weights between other selected source nodes and destination nodes.

Figure 8:
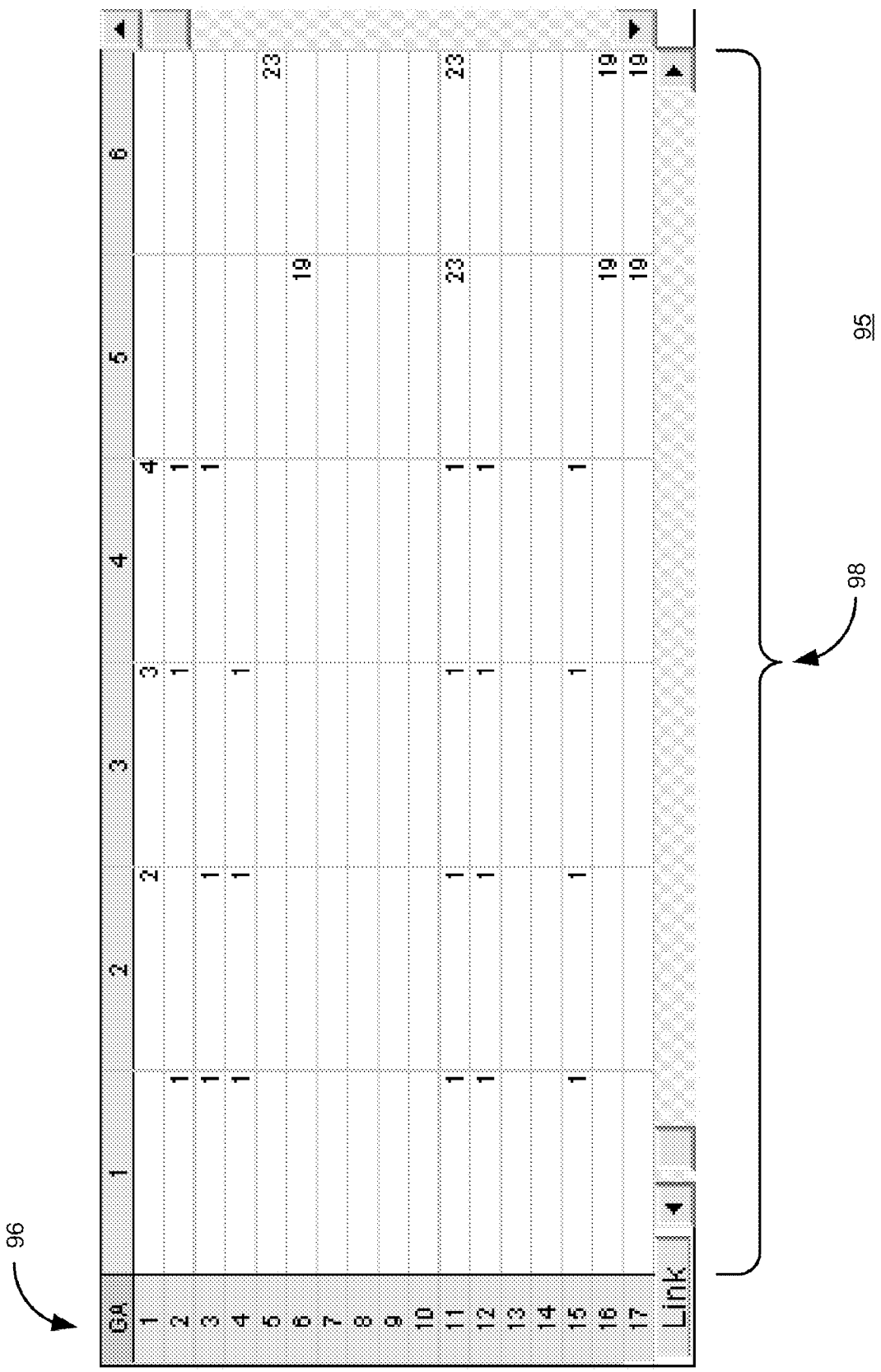
FIG. 8 is an exemplary local routes table.

FIG. 8 is an exemplary local routes table. In FIG. 8, a portion of a local routes table 95 may present best next-hops for optimal routing given weights, user-defined utility function and the involved network topology.

Source or originating nodes may be indicated in rows 96. Destination nodes may be indicated in columns 98. Columns 98 may cooperate with rows 96 to establish an array of matrix positions. Each respective matrix position may be identified by unique (Destination Node#, Source Node#) coordinates. A respective next-hop node associated with traversing a path between a particular source node and a particular destination node may be indicated at a respective matrix position (Destination Node#, Source Node#). A blank matrix position may indicate no connection between those two nodes in a particular local domain.

Local routes table 95 may be created by running a shortest path algorithm such as, by way of example and not by way of imitation, a Bellman-Ford algorithm, in connection with local path weights information, such as path weight information described above in connection with FIG. 7. Local routes table 95 may record the best "next hop" for optimal routing from a particular source node to a particular destination node for a given path weight. As mentioned above in connection with FIG. 7, path weights may be related with a user defined utility function, a network topology or other factors.

Regarding FIGS. 1 and 8 together, one may ascertain, by way of example and not by way of limitation, that local routes table 95 records that for a message to travel from a source node 5 to reach a destination node 6, the message may advantageously next go to node 23. Because a blank indicates no connectivity on a local network, by way of example and not by way of limitation, for a message to travel from source node 7 to destination node 2 a gateway node must be found.

Gateway connectivity may indicate how a message may reach remote networks or domains. Gateway connectivity may be determined based on an abstracted hierarchical view of network topology, as illustrated in FIG. 9.

Figure 9:
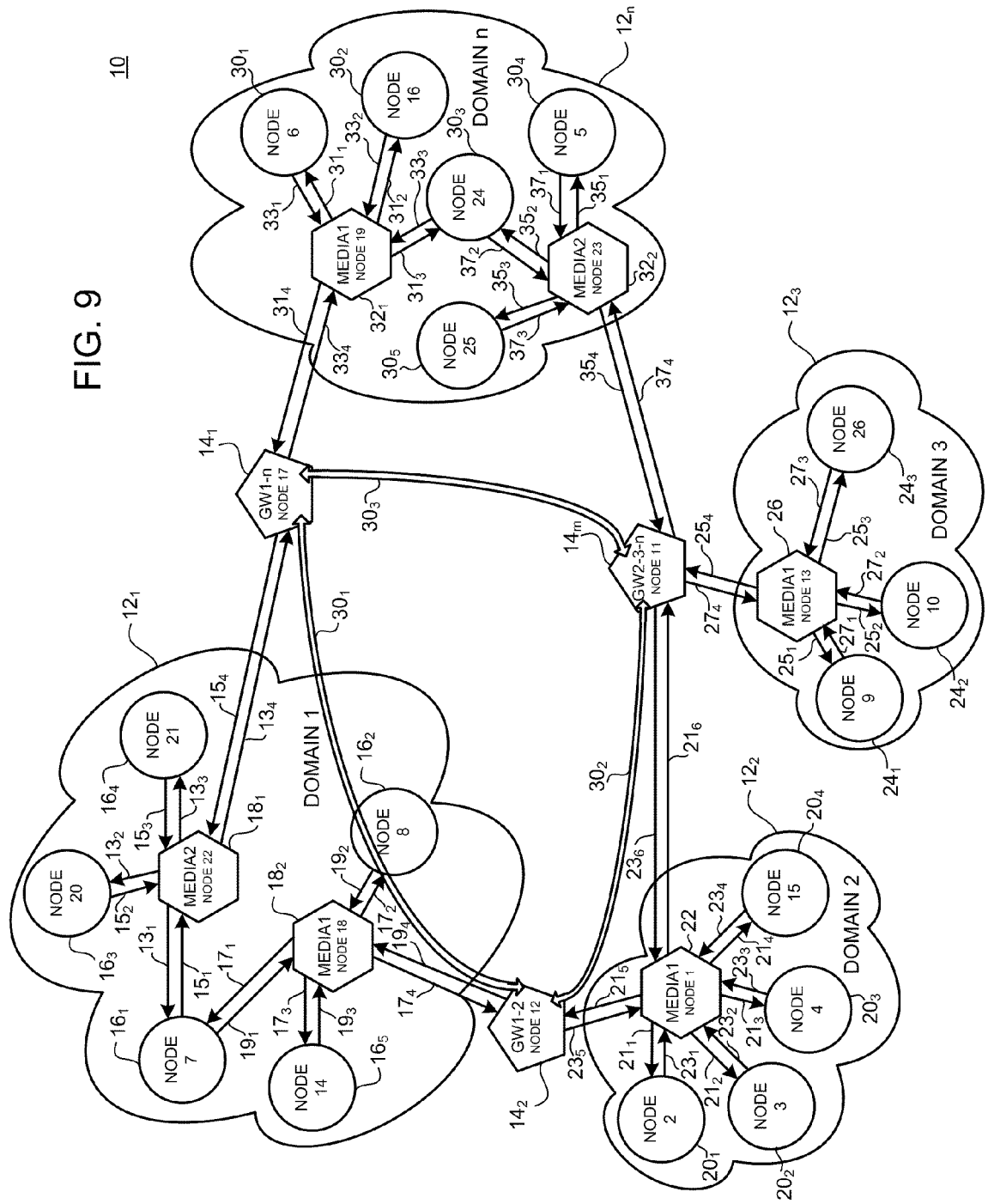
FIG. 9 is a schematic diagram of the network illustrated in FIG. 1 with indications of gateway connectivity identified using the present disclosure.

FIG. 9 is a schematic diagram of the network illustrated in FIG. 1 with indications of gateway connectivity identified using the present disclosure. In FIG. 9, a network 10 including a plurality of domains $12_1$, $12_2$, $12_3$, $12_n$ substantially similar to network 10 illustrated in FIG. 1 is presented, with connectivity among gateway units or nodes $14_1$, $14_2$, $14_m$ indicated. In order to avoid prolixity, a detailed description of network 10 in FIG. 9 will not be repeated here. A reader may refer to the description provided in connection with FIG. 1 to review details of configuration of network 10. Only differences from FIG. 1 will be described in detail with respect to FIG. 9.

A hierarchical gateway topology may be embodied in a gateway connectivity path $30_1$ coupling gateway unit or node $14_1$ with gateway unit $14_2$, a gateway connectivity path $30_2$ coupling gateway unit or node $14_2$ with gateway unit $14_m$ and a gateway connectivity path $30_3$ coupling gateway unit or node $14_m$ with gateway unit $14_1$.

Gateway nodes $14_1$, $14_2$, $14_m$ are illustrated in FIG. 9 as being located between or among adjacent domains $12_n$ as a matter of drawing convenience to reduce clutter in FIG. 9. One skilled in the art of modeling communication networks may recognize that a gateway node or unit is actually a part of each domain the gateway node or unit serves and may be illustrated as located within each of the adjacent domains served.

Gateway connectivity may be treated in a manner similar to treatment of network edges. That is, by way of example and not by way of limitation, one may derive a weights table based on a user specified utility function. Such a gateway-related weights table may be embodied in a gateway path length table of the sort illustrated in FIG. 10.

FIG. 10 is a representative gateway path lengths table that may be employed in connection with the present disclosure. In FIG. 10, a portion of a gateway-related weights table 300 may present path weights, expressed in terms of path lengths, for each of the gateway-to-gateway connections in network 10 (FIG. 9). Source or originating gateways may be indicated in rows 302. Destination gateways may be indicated in columns 304. Columns 304 may cooperate with rows 302 to establish an array of matrix positions, each respective matrix position being identified by unique (Destination Gateway #, Source Gateway #) coordinates. A respective path length associated with traversing a path between a particular source gateway and a particular destination gateway may be indicated at a respective matrix position (Destination Gateway #, Source Gateway #).

Path lengths may be assigned according to a user defined utility function. FIG. 10 may reflect a preference for higher capacity networks by having employed a utility function of 1/capacity. Other utility functions may be employed such as, by way of example and not by way of limitation, a preference for the fewest intermediate gateways, a preference for gateways connecting to a certain network or another preference.

Regarding FIGS. 9 and 10 together, one may observe that paths may exist between gateway node 11 and each of gateway nodes 12 and 17. Accordingly, there are path lengths indicated in matrix positions (12,11) and (17,11). Other matrix positions associated with originating or source gateway node 11 are blank, indicating there is no connection between nodes indicated by those matrix positions.

It may be regarded as within the skill of one skilled in the art of network design to understand how one may use FIGS. 9 and 10 to ascertain path lengths between other selected source gateways and destination gateways.

FIG. 11 is a representative gateway connectivity table that may be employed in connection with the present disclosure. In FIG. 11, a portion of a gateway connectivity table 310 may present best next-gateway to reach a particular gateway on the hierarchical gateway topology (FIG. 9) in view of the preference for gateways having higher capacity networks.

Source or originating gateway nodes may be indicated in rows 312. Destination gateway nodes may be indicated in columns 314. Columns 314 may cooperate with rows 312 to establish an array of matrix positions. Each respective matrix position may be identified by unique (Destination Gateway Node#, Source Gateway Node#) coordinates. A respective next-gateway node associated with traversing a path between a particular source gateway node and a particular destination gateway node may be indicated at a respective matrix position (Destination Gateway Node#, Source Gateway Node#).

Gateway connectivity table 310 may be created by running a shortest path algorithm such as, by way of example and not by way of imitation, a Bellman-Ford algorithm, in connection with path weights, expressed in terms of path lengths, representatively presented as path length information described above in connection with FIG. 10. Gateway connectivity table 310 may record the best next gateway for optimal routing from a particular source gateway node to a particular destination gateway node for a given path length. Path lengths may be related with a user defined utility function, a network topology or other factors.

Regarding FIGS. 9 and 11 together, one may ascertain, by way of example and not by way of limitation, gateway connectivity table 310 records that for a message to travel from a source gateway node 11 to reach a destination gateway node 12, the message may advantageously next go to gateway node 17.

It may be regarded as within the skill of one skilled in the art of network design to understand how one may use FIGS. 9 and 11 to optimal routing from a particular source gateway node to a particular destination gateway node for a given path length.

Once a gateway connectivity table 310 has been developed one may still require a process for effecting gateway selection.

Figure 12:
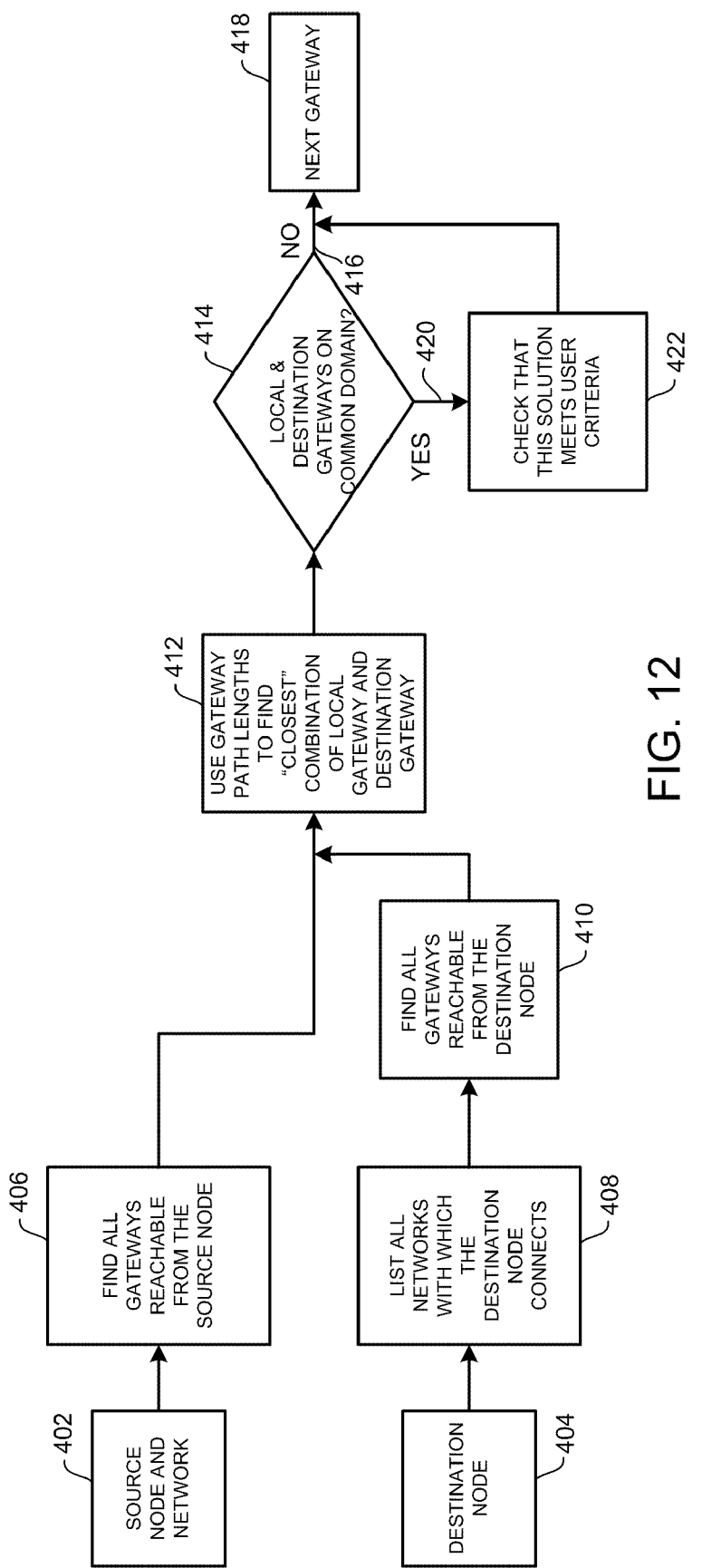
FIG. 12 is a flow chart illustrating a gateway selection process using the present disclosure.

FIG. 12 is a flow chart illustrating a gateway selection process using the present disclosure. In FIG. 12, a process 400 may begin with an identified source node and network, as indicated by a block 402, and with an identified destination node, as indicated by a block 404. Dealing with the identified source node, one may find all gateways reachable from the designated source node, as indicated by a block 406. Dealing with the identified destination node, one may list all networks with which the identified destination node connects, as indicated by a block 408. Process 400 may continue by finding all gateways reachable from the identified destination node, as indicated by a block 410.

Process 400 may continue with using gateway path lengths (as discussed in connection with FIG. 10) to find a closest combination (i.e., optimal route choice) of local gateway and destination gateway, as indicated by a block 412.

Process 400 may continue by posing a query whether the local and destination gates found pursuant to block 412 are on a common domain, as indicated by a query block 414. If the local and destination gates are not on a common domain, process 400 may proceed from query block 414 via a NO response line to select a next gateway in block 412, as indicated by a block 418. If the local and destination gates are on a common domain, process 400 may proceed from query block 414 via a YES response line 420 to check whether the solution meets user criteria, as indicated by a block 422. Process may continue by selecting a next gateway in block 412, as indicated by a block 418.

By way of example and not by way of limitation, referring to network 10 (FIG. 1) if node 14 (node $16_5$; FIG. 1) may be selected as a source node for sending a message to a destination node in domain $12_3$, node 14 may do so via gateway unit $14_2$ (node 12) or via gateway unit $14_1$ (node 17). Gateway units $14_1$, $14_2$ may be regarded as "local" to a node in domain $12_1$. One may observe that only one gateway unit is "local" to a destination node in domain $12_3$: gateway unit $14_m$ (node 11).

One may keep in mind that network 10 (FIG. 1) may represent a simplified network, and in a real-world network there may be a plurality of other gateway nodes that may be regarded as "local" to destination network $12_3$. A gateway connectivity table (e.g., gateway connectivity table 314; FIG. 11) may illustrate a series of gateway units that may need to be traversed if either choice is made. That is, gateway unit $14_2$ (node 12) may reach gateway unit $14_m$ (node 11) by going through gateway unit $14_1$ (node 17).

By way of example and not by way of limitation, a routing solution may be selected based upon a preference for using highest capacity networks, which resulted in a gateway path weight utility function of 1/capacity. This may have been a premise for constructing gateway connectivity table 314 (FIG. 11). Using gateway connectivity table 310, one may note that gateway unit $14_2$ (node 12) may relay traffic to node 17 and then to node 11. This "shortest path" series of gateway units may be preferred because domain $12_2$ may have a significantly lower capacity than domain $12_1$ and domain $12_n$. Node 17 may reach node 11 directly because nodes 11, 17 share domain $12_n$. Consulting gateway path lengths table 300 (FIG. 10), one may observe that in proceeding from node 12 to node 11 one may incur a "cost" of 0.7, and in proceeding from node 17 to node 11 one may incur a "cost" of 0.2. In such a situation gateway unit $14_2$ (node 12) may advantageously select node 17 as a preferred gateway unit to reach domain $12_3$.

Additional heuristic rules may be developed for gateway selection to accommodate situations when a shortest path gateway solution may not result in realistic behavior. An example of a situation like this may arise when trying to send a message from node 9 to node 12. Only one "local" gateway unit exists: gateway unit $14_m$ (node 11). However, once the message reaches gateway unit $14_m$ (node 11), the message may then "see" gateway unit $14_2$ (node 12) on its own local routing table since node 11 is a gateway with both domain $12_3$ and domain $12_2$. Node 12, conversely, happens to be a gateway with both domain $12_1$ and domain $12_2$. Since no additional gateway is required, node 11 may choose to use its local gateway functionality to translate the message to a language used in domain $12_2$. However, a user may desire to have node 11 opt instead to keep the message on higher capacity domains (domains $12_1$, $12_n$, in this case) even if routing may not be the most direct solution. Such additional heuristic logic may be incorporated into the process of building route tables for network 10 (FIG. 1).

Figure 13:
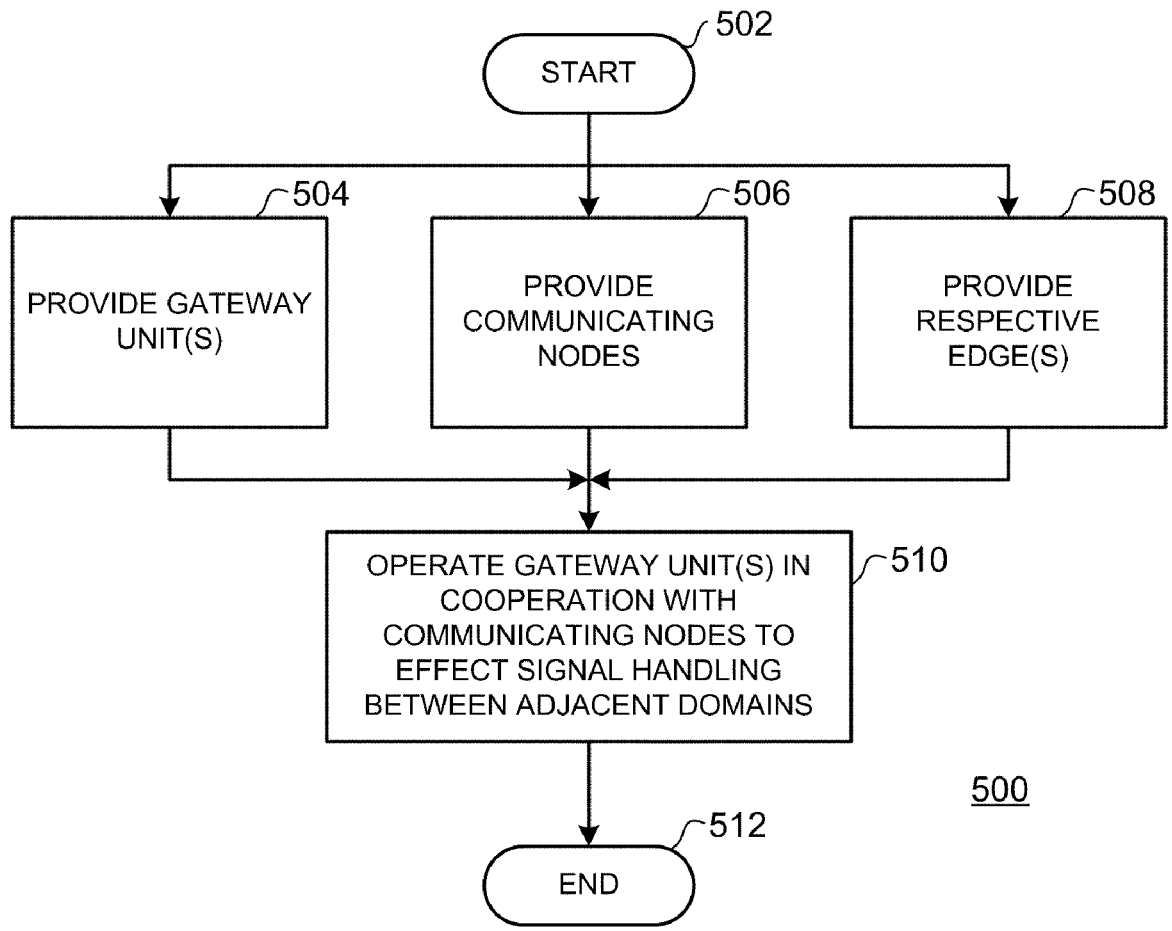
FIG. 13 is a flow chart illustrating the method of the present disclosure.

FIG. 13 is a flow chart illustrating the method of the present disclosure. In FIG. 13, a method 500 for evaluating a network may begin at a START locus 502. The network may include a plurality of domains. Each respective domain of the plurality of domains may embody a respective topology. The method may include: (a) in no particular order: (1) providing at least one gateway unit, as indicated by a block 504; (2) providing a plurality of communicating nodes coupled with the at least one gateway unit, as indicated by a block 506; at least one first selected node of the plurality of communicating nodes being a unicast node; at least one second selected node of the plurality of communicating nodes being a multicast node; at least one node of the plurality of communicating nodes being a media node; each respective unicast node of the at least one unicast node being configured for handling message traffic addressed to the respective unicast node; each respective multicast node of the at least one multicast node being connected with at least one media node of the at least one media node within a respective domain of the plurality of domains; the respective media node being configured for handling message traffic addressed to respective the multicast nodes connected with the respective media node individually or en masse; and (3) providing at least one respective edge establishing a respective communication link between adjacent respective communicating nodes of the plurality of communicating nodes, as indicated by a block 508.

Method 500 may continue with operating each respective gateway unit of the at least one gateway unit in cooperation with the plurality of communicating nodes to effect signal handling between adjacent the respective domains, as indicated by a block 510. Method 500 may terminate at an END locus 512.

It is to be understood that, while the detailed drawings and specific examples given describe preferred embodiments of the disclosure, they are for the purpose of illustration only, that the apparatus and method of the disclosure are not limited to the precise details and conditions disclosed and that various changes may be made therein without departing from the spirit of the disclosure which is defined by the following claims:

We claim:

1. A system for evaluating a network; said network including a plurality of domains; each respective domain of said plurality of domains embodying a respective topology; the system comprising:
    (a) at least one gateway unit; a respective gateway unit of said at least one gateway unit effecting signal handling between adjacent said respective domains; each respective gateway unit of said at least one gateway unit having a respective plurality of radio objects for modeling communications in two or more domains of said plurality of domains;
    (b) a plurality of communicating nodes coupled with said at least one gateway unit; and
    (c) at least one respective edge establishing a respective communication link between adjacent respective communicating nodes of said plurality of communicating nodes;
    at least one first selected node of said plurality of communicating nodes being a unicast node; at least one second selected node of said plurality of communicating nodes being a multicast node; and at least one node of said plurality of communicating nodes being a media node; each respective unicast node of said at least one unicast node being configured for handling message traffic addressed to said respective unicast node; each respective multicast node of said at least one multicast node being connected with at least one media node of said at least one media node within a respective domain of said plurality of said domains; each respective media node of said at least one media node being configured for handling message traffic addressed to one or more of said multicast nodes connected with said respective media node individually or en masse; each said respective unicast node and each said respective multicast node having at least one respective radio object for modeling communications in a respective domain of said plurality of domains; each said respective media node having at least one respective radio object for modeling communications among at least one said respective gateway unit and at least one of a respective unicast node and a plurality of said multicast nodes.

2. The system for evaluating a network as recited in claim 1 wherein said at least one respective edge establishes a respective communication capability for each said respective communication link.

3. The system for evaluating a network as recited in claim 2 wherein all of said multicast nodes representing addressees of a multicast message connected with a respective media node receive said multicast message substantially simultaneously.

4. The system for evaluating a network as recited in claim 3 wherein said respective communication capability for each said respective communication link is expressed in terms reflecting at least one of communication link capacity, traffic load, physical distance between connected nodes and capacity of domains coupled with said respective edge.

5. The system for evaluating a network as recited in claim 2 wherein said respective communication capability for each said respective communication link is expressed in terms reflecting at least one of communication link capacity, traffic load, physical distance between connected nodes and capacity of domains coupled with said respective edge.

6. The system for evaluating a network as recited in claim 1 wherein all of said multicast nodes representing addressees of a multicast message connected with a respective media node receive said multicast message substantially simultaneously.

7. A model for evaluating a network; said network including a plurality of domains embodying a plurality of network types; the model comprising:
    (a) a plurality of nodes distributed among said plurality of domains; each respective node of at least one first selected node of said plurality of nodes representing a physical communication node in said network and having at least one respective radio object for modeling communications in a respective domain of said plurality of domains; each respective node of at least one second selected node of said plurality of nodes representing a physical gateway node in said network and having a respective plurality of radio objects for modeling communications in two or more domains of said plurality of domains; each respective node of at least one third selected node of said plurality of nodes representing a media node in said network and having at least one respective radio object for modeling communications among at least one said respective second selected node and a plurality of said respective first selected nodes;
    (b) a plurality of edges connecting said plurality of nodes; each respective edge of said plurality of edges connecting a respective two connected nodes of said plurality of nodes; each said respective edge being associated with a respective network type of said plurality of network types; and
    (c) a route managing unit coupled with at least a subset of said plurality of nodes;
    said route managing unit cooperating with said at least one second selected node and said plurality of edges to effect developing at least one route table; said at least one route table being employed by said route managing unit to identify selected respective edges of said plurality of edges for effecting routing of a message through said network.

8. The model for evaluating a network as recited in claim 7 wherein each respective route table of said at least one route table presents a sequential list of hops required for conveying a communication from a respective node of said plurality of nodes to at least one selected destination node for said communication.

9. The model for evaluating a network as recited in claim 8 wherein each said respective edge establishes a respective communication capability for each said respective two connected nodes, wherein all of said plurality of nodes representing addressees of a multicast message connected with a respective node of said third selected nodes receive said multicast message substantially simultaneously, and wherein said respective communication capability for each said respective two connected nodes is expressed in terms reflecting at least one of communication link capacity, traffic load, physical distance between connected nodes and capacity of domains coupled with said respective edge.

10. The model for evaluating a network as recited in claim 7 wherein all of said plurality of nodes representing addressees of a multicast message connected with a respective node of said third selected nodes receive said multicast message substantially simultaneously.

11. The model for evaluating a network as recited in claim 7 wherein said at least one route table for each said respective two connected nodes is expressed in terms reflecting at least one of communication link capacity, traffic load, physical distance between connected nodes and capacity of domains coupled with said respective edge.

12. The model for evaluating a network as recited in claim 7 wherein each said respective edge establishes a respective communication capability for each respective two connected nodes of said plurality of nodes.

13. The model for evaluating a network as recited in claim 12 wherein all of said plurality of nodes representing addressees of a multicast message connected with a respective node of said third selected nodes receive said multicast message substantially simultaneously.

14. The model for evaluating a network as recited in claim 13 wherein said respective communication capability for each said respective two connected nodes is expressed in terms reflecting at least one of communication link capacity, traffic load, physical distance between connected nodes and capacity of domains coupled with said respective edge.

15. A method for evaluating a network; said network including a plurality of domains; each respective domain of said plurality of domains embodying a respective topology; the method comprising:
 (a) in no particular order:
  (1) providing at least one gateway unit; each respective gateway unit of said at least one gateway unit having a respective plurality of radio objects for modeling communications in two or more domains of said plurality of domains;
  (2) providing a plurality of communicating nodes coupled with said at least one gateway unit; at least one first selected node of said plurality of communicating nodes being a unicast node; at least one second selected node of said plurality of communicating nodes being a multicast node; at least one node of said plurality of communicating nodes being a media node; each respective unicast node of said at least one unicast node being configured for handling message traffic addressed to said respective unicast node; each respective multicast node of said at least one multicast node being connected with at least one media node of said at least one media node within a respective domain of said plurality of domains; each respective media node of said at least one media node being configured for handling message traffic addressed to respective said multicast nodes connected with said respective media node individually or en masse; each said respective unicast node and each said respective multicast node having at least one respective radio object for modeling communications in a respective domain of said plurality of domains; each said respective media node having at least one respective radio object for modeling communications among at least one said respective gateway unit and at least one of a respective unicast node and a plurality of said multicast nodes; and
  (3) providing at least one respective edge establishing a respective communication link between adjacent respective communicating nodes of said plurality of communicating nodes; and
 (b) operating each respective gateway unit of said at least one gateway unit in cooperation with said plurality of communicating nodes to effect signal handling between adjacent said respective domains.

16. The method for evaluating a network as recited in claim 15 wherein said at least one respective edge establishes a respective communication capability for each said respective communication link.

17. The method for evaluating a network as recited in claim 16 wherein all of said plurality of nodes representing addressees of a multicast message connected with a respective media node receive said multicast message substantially simultaneously.

18. The method for evaluating a network as recited in claim 17 wherein said respective communication capability for each said respective communication link is expressed in terms reflecting at least one of communication link capacity, traffic load, physical distance between connected nodes and capacity of domains coupled with said respective edge.

19. The method for evaluating a network as recited in claim 16 wherein said respective communication capability for each said respective communication link is expressed in terms reflecting at least one of communication link capacity, traffic load, physical distance between connected nodes and capacity of domains coupled with said respective edge.

20. The method for evaluating a network as recited in claim 15 wherein all of said plurality of nodes representing addressees of a multicast message connected with a respective media node receive said multicast message substantially simultaneously.

\* \* \* \* \*